April 30, 1957 A. H. WAKEMAN 2,790,627
PLATE TYPE HEAT EXCHANGER
Filed Jan. 3, 1955

INVENTOR.
Alden H. Wakeman
BY
Thiess, Olson, Mecklenburger,
von Holst & Coltman.

United States Patent Office 2,790,627
Patented Apr. 30, 1957

2,790,627

PLATE TYPE HEAT EXCHANGER

Alden H. Wakeman, Lakemills, Wis., assignor to The Creamery Package Mfg. Company, Chicago, Ill., a corporation of Illinois Application January 3, 1955, Serial No. 479,523

3 Claims. (Cl. 257—245)

This invention relates to a gasket construction and, more particularly, to a gasket adapted for use in a plate heat exchanger.

In plate heat exchangers of the type, for example, used in the dairy industry for the pasteurization of milk and the like, one of the principal problems in the maintenance of such equipment relates to the gaskets which are disposed intermediate the heat exchange plates and delimit the passageways formed between such plates and through which the product to be pasteurized is caused to flow.

Various gaskets of this type have heretofore been proposed which, however, because of their designs fail to rectify the difficulties associated with such gasket maintenance.

One such difficulty is that, when the plates are subjected to a lock-up force of sufficient magnitude as to effect a seal between adjacent plates, the side of each gasket adjacent the delimited passageway bulges into the passageway to such an extent that it overhangs the gasket edge, adjacent the passageway and adhesively secured to the one plate surface, and produces an elongated wedge-shaped pocket into which milk solids become entrapped and subsequently adhere to the plate surface.

A second difficulty is that such gaskets normally have a relatively broad area which contacts the adjacent plate surface thereby resulting in a greater lock-up force being applied in order to effect a proper seal. In addition, by reason of such gaskets having a relatively broad area which contacts the adjacent plate surface, any irregularities or imperfections on the plate surface will result in portions of the seal being relatively weak or less effective notwithstanding the amount of lock-up force exerted.

A third difficulty stems from the fact that the relatively broad surface-contacting area of each gasket results in a uniformly larger lock-up force being applied to effect a seal. Because of the relatively larger lock-up force, the bulging of the gasket side mentioned in regard to the first indicated difficulty is materially accentuated and thereby aggravates such first difficulty.

A fourth difficulty resides in the fact that as the side of the gasket adjacent the passageway bulges into such passageway and overhangs the adhesively secured edge of the gasket, the latter edge is subjected to extreme tension forces as the lock-up pressure is exerted, thereby resulting in rupturing of the adhesive bond after a relatively short period of time.

An additional difficulty associated with prior gasket constructions is that, where the gasket is adhesively secured to a portion of a plate surface having indentations formed therein, the area of the gasket adapted to contact the adjacent plate surface is disposed in aligned relation with such indentations, thereby resulting in slight depressions being formed in such contacting gasket area at locations corresponding to said identations. By reason of such depressions in the contacting area of the gasket, greater difficulty is encountered in perfecting a proper seal.

Because of the afore-enumerated difficulties associated with prior gasket constructions, proper cleaning of the individual plates is a time-consuming operation, particularly in the dairy industry where thorough cleaning of each plate, daily or after a predetermined number of runs, is required under the public health laws.

Thus, it is one of the objects of this invention to provide a gasket for a heat exchange plate and the like which materially reduces maintenance and maintenance costs of such plate.

It is a further object of this invention to provide a gasket which requires a relatively small amount of compressive force to perfect a proper seal between two abutting plate surfaces.

It is a still further object of this invention to provide a gasket for heat exchange plates and the like which facilitates the plate cleaning operation and results in an improved rate of heat transfer.

It is a still further object of this invention to provide an improved gasket having a prolonged effective life.

It is a still further object of this invention to provide an improved gasket which provides greater heat exchange area for a heat exchange plate of a given dimension.

It is a still further object of this invention to provide a gasket which is simple, yet sturdy in construction, effective in operation, and inexpensive to produce.

Further and additional objects will appear from the description, accompanying drawings, and appended claims.

In accordance with one embodiment of this invention, a gasket is provided for use intermediate abutting plate surfaces of a plate heat exchanger to delimit the passageway, or passageways, formed between such surfaces. The gasket is formed of resilient compressible material and comprises an elongated body having a substantially flat base side which is adapted to be adhesively secured to one of the abutting plate surfaces. The side of the body adjacent the passageway is inclined outwardly and away from the base side and cooperates with the opposite or outer side of the body to form an elongated ridge which is spaced from the base side and is adapted to contact the passageway-forming surface of the adjacent abutting plate. The acclivity of the inclined side of the body is such that when the body is under compression, the side will not protrude outside the area defined by the base side.

For a more complete understanding of this invention, reference should be made to the drawing wherein.

Figure 1:
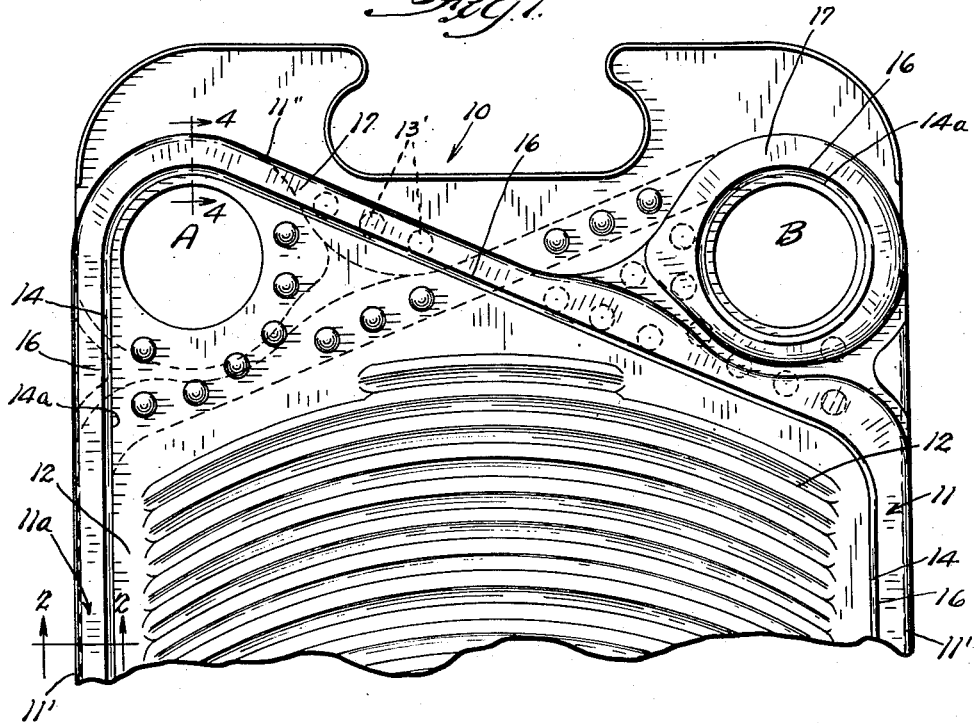
Figure 1 is a fragmentary front elevational view of a heat exchange plate provided with the improved gasket.

Referring now to the drawings and, more particularly, to Fig. 1, a heat exchange plate 10 incorporating the improved gasket 11 is shown. The plate 10, in this instance, is of the type disclosed in applicant's copending application Serial No. 358,264, filed May 29, 1953, now Patent No. 2,777,674, dated January 15, 1957. It is to be understood, of course, that the improved gasket is not limited to a heat exchange plate of this particular design, but is adapted for use in other types of heat exchange plates as well, which, when in assembled relation, are adapted to be disposed in face-to-face contacting relation.

The plate 10, in this instance, is formed of relatively thin gauge metal and is substantially rectangular in shape. The opposite end portions of each plate are normally provided with either a single opening or, as shown in Fig. 1, with a pair of spaced openings A and B. The number of openings in the plate will depend upon the relative position of the plate within the assembled group of plates and the flow paths desired for the circulating product. The center portion 12 of each plate, disposed intermediate the apertured end portions, is normally corrugated or otherwise deformed so as to effect turbulence of the product as the latter flows over such center section. The center sections of adjacent contacting plates are adapted to form a passageway through which the product flows. On one surface or side of a plate, a pair of diagonally opposed apertures are in communication with the center portion of the plate while the other pair of diagonally opposed apertures are, or the other single aperture is, out of communication with the center portion. On the opposite surface of the plate, the communication of the apertures with the center portion is reversed.

Figure 2:
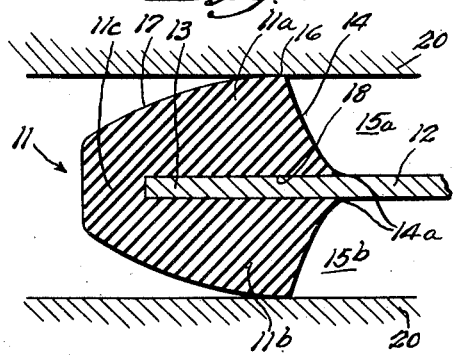
Fig. 2 is an enlarged fragmentary sectional view taken along line 2—2 of Fig. 1 and showing the gasket in an uncompressed condition and disposed intermediate two surfaces.
Figure 3:
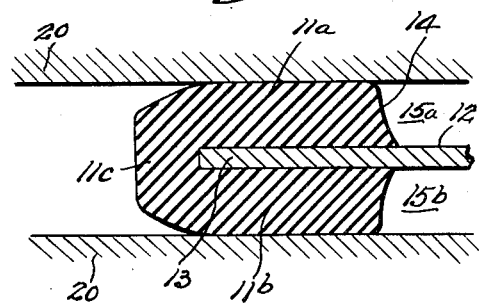
Fig. 3 is similar to Fig. 2 and showing the gasket under compression.

The improved gasket 11, when incorporated in the plate 10 shown in Fig. 1, is mounted on alternate plates so as to delimit the center portion and the proper aperture or apertures which are to be in communication therewith on each side or surface of the plate. The gasket in addition effects a seal between the assembled plates. The improved gasket 11 is formed of resilient rubberlike material which is capable of withstanding high compressive force and is not adversely affected by, or does not deleteriously affect, the product flowing through the exchanger. The gasket 11, as shown in Figs. 2 and 3, has segments 11 thereof adapted to encompass the planar marginal edge portion 13 of the center portion 12 of the plate so that like sections 11a and 11b of the gasket are disposed on the opposite sides of the plate. The gasket sections 11a and 11b are integrally connected to one another at their outer ends by a bight section 11c which is disposed on the exposed or outer edge of the plate. The inner surface 14 of each gasket section 11a or 11b— that is the surface of the gasket adjacent the passageway 15a or 15b formed between adjacent heat exchange plates—is inclined outwardly away from the plate surface 12 and terminates in a relatively sharp ridge or plateau 16 formed at the juncture of the inner side 14 and outer side 17 of the gasket section.

It will be noted in Fig. 1 that ridge 16 is off-center with respect to the longitudinal centerline of gasket section 11a or 11b, and thus, in instances where the gasket sections overlie indentations 13' formed in the plate 10, the possibility of depressions being formed in the sealing surface of the gasket is either eliminated entirely or materially reduced, thereby providing a more uniform seal between the abutting plate and gasket section. Outer side 17 stems from bight section 11c and is arcuate, or somewhat convex, in shape, when the gasket is in its uncompressed state, see Fig. 2. The shape of side 17 may be varied, if desired, so long as it provides adequate support for the ridge 16, which effects the seal between the gasket and abutting plate surface 20. The pocket or spacing 18 formed between gasket sections 11a and 11b is adapted to snugly accommodate the edge portion 13 of the plate. The surfaces of the sections 11a and 11b, which form the pocket 18, may be considered as the base surfaces of the sections and are adhesively secured to or vulcanized on the accommodated plate edge portion 13.

The inclination or slope of side 14 is limited by the following considerations: (a) that it be sufficient to support the ridge 16 when the seal is effected; (b) that it will not form a wedge-shaped recess between the abutting plate surface and the side 14 which will entrap milk solids or the like; (c) that it will not cause the ridge to be aligned with the longitudinal centerline of the gasket section; (d) that the side 14 will not bulge into the passage formed between the plates and overhang the inner secured edge 14a of the gasket section 11a or 11b when full plate lock-up force is applied so as to form an elongated crevice in which milk solids or the like might become entrapped; and (e) that the side 14, when under pressure, will not deform to such an extent so as to overhang the adhesively secured edge of the gasket and result in the adhesively secured edge being subjected to extreme tension forces.

It has been found, however, in the plate heat exchanger of the type disclosed in the copending application Serial No. 358,264, now Patent No. 2,777,674, that the preferred inclination of side 14 is approximately 30° from the vertical axis when the hardness of the gasket material is approximately 60 Shore A durometer and the internal operating pressure, or pressure within the passageways, is approximately 100 p. s. i.

In prior gaskets of this type, such crevices often were formed which resulted in the entrapped product being deposited on the surface of the plate thereby complicating and impairing the plate cleaning operation and also adversely effecting the rate of heat transfer. Where the exchanger is of the type utilized for pasteurization of milk in a dairy processing plant, the matter of properly cleaning the heat exchange plates is of paramount importance and must, in compliance with public health laws, be attended to daily or after a predetermined period.

By having a relatively sharp ridge 16 formed on each gasket section 11a or 11b, a smaller compressive force is required to deform the ridge portion and effect a proper sealing contact between the abutting surfaces, as seen in Fig. 3. In prior gaskets of this type, the contacting surface was relatively broad and/or flat, thereby requiring a greater amount of the gasket material to be subjected to the compressive force. Where numerous plates are utilized in an exchanger, the accumulated resistance resulting from these prior gaskets is appreciable and, therefore, has a pronounced effect on the amount of compressive force required to produce the necessary seal between the plates.

In prior gaskets which have a relatively narrow contacting surface, there has always been the problem of the gasket, when under pressure, deforming to a marked degree and resulting in the undesirable recesses or crevices being formed in which milk solids or the like are entrapped. This difficulty is averted in the improved gasket by reason of the novel shape heretofore described.

Figure 4:
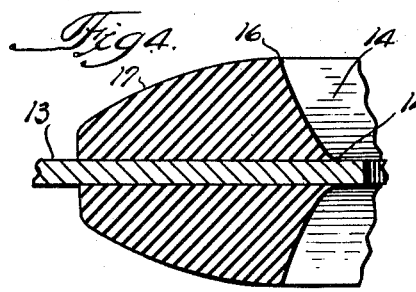
Fig. 4 is an enlarged fragmentary sectional view taken along line 4—4 of Fig. 1.

The segment 11" of the improved gasket, which partially encircles end opening A and/or B, has the sections 11a and 11b thereof not integrally connected to one another, see Fig. 4. Aside from this difference, gasket segments 11' and 11" are of substantially the same design.

The cross-sectional size of the improved gasket, particularly in regard to side 17, may vary to a considerable extent depending upon the point of the gasket at which such section is taken. For example, portions of the gasket surrounding aperture B are considerably wider than the portions of the gasket disposed along the elongated sides of the plate so as to provide greater support between the abutting plate surfaces. In any case, it is of utmost importance that the side of the gasket section in contact with the circulating product be uniform and inclined from the plate surface.

Thus, it will be seen that an improved gasket for heat exchange plates and the like has been provided which requires less compressive force to effect a proper seal, facilitates cleaning of the plate surface, is simple, yet sturdy, in construction, and is inexpensive to produce.

While a particular embodiment of this invention is shown above, it will be understood, of course, that the invention is not limited thereto, since many modifications may be made, and it is contemplated, therefore, by the appended claims, to cover any such modifications as fall within the true spirit and scope of this invention.

I claim:

1. A plate heat exchanger comprising a pair of relatively spaced first plates having substantially planar surface portions, a second plate disposed intermediate said first plates, gasket means disposed intermediate said second plate and said first plates and cooperating with said second plate and the planar surface portions of said first plates to form passageways on opposite sides of said second plate, and means operative on said plates to effect compression of said gasket means intermediate said plates; said gasket, when in uncompressed state, having a concave surface portion extending from the planar surface of one of said first plates to the adjacent surface of said second plate and defining a side wall for the passageway formed intermediate said plates.

2. A plate heat exchanger comprising a pair of relatively spaced first plates having substantially planar surface portions, a second plate disposed intermediate said first plates, gasket means having sections thereof mounted on said second plate and cooperating with said first and second plates to form passageways on opposite sides of said second plate, and means operative on said plates to effect compression of said gasket means intermediate said plates; each section, when in an uncompressed state, including a concave surface portion extending from the planar surface portion of one of said first plates to the adjacent surface of said second plate and forming a side wall for the passageway formed intermediate said plates.

3. A plate heat exchanger comprising a pair of relatively spaced first plates having substantially planar marginal surface portions, a second plate disposed intermediate said first plates, a pair of integrally connected gasket sections, one mounted on one side of said second plate and the other mounted on the opposite side of said second plate, said sections cooperating with said first plates to form passageways intermediate said plates, and means operative on said plates to effect compression of said gasket means intermediate said plates; each gasket section, when in an uncompressed state, including a concave surface portion extending from the substantially planar marginal surface portion of one of said first plates to the adjacent surface of said second plate and forming a side wall for the passageway formed intermediate said plates.

References Cited in the file of this patent

UNITED STATES PATENTS

| | | |
|---|---|---|
| 2,181,230 | Groat | Nov. 28, 1939 |
| 2,191,044 | Seligman | Feb. 20, 1940 |

FOREIGN PATENTS

| | | |
|---|---|---|
| 660,446 | Great Britain | Nov. 7, 1951 |